(12) United States Patent
Russell et al.

(10) Patent No.: US 10,191,484 B2
(45) Date of Patent: Jan. 29, 2019

(54) RIDER CONTROLLED TRACKLESS RIDE SYSTEM

(71) Applicant: Oceaneering International, Inc., Houston, TX (US)

(72) Inventors: Michael Russell, Orlando, FL (US); Michael Wayne Boshears, Orlando, FL (US); Lauren Marie Etta, Orlando, FL (US)

(73) Assignee: Oceaneering International, Inc., Houston, TX (US)

( * ) Notice: Subject to any disclaimer, the term of this patent is extended or adjusted under 35 U.S.C. 154(b) by 162 days.

(21) Appl. No.: 15/474,876

(22) Filed: Mar. 30, 2017

(65) Prior Publication Data

US 2017/0285636 A1   Oct. 5, 2017

Related U.S. Application Data

(60) Provisional application No. 62/315,425, filed on Mar. 30, 2016.

(51) Int. Cl.
| | |
|---|---|
| *G05D 1/00* | (2006.01) |
| *G05D 1/02* | (2006.01) |
| *A63G 25/00* | (2006.01) |

(52) U.S. Cl.
CPC ........... *G05D 1/0027* (2013.01); *A63G 25/00* (2013.01); *G05D 1/0011* (2013.01); *G05D 1/028* (2013.01); *G05D 1/0212* (2013.01); *G05D 1/0287* (2013.01)

(58) Field of Classification Search
CPC .... G05D 1/0027; G05D 1/028; G05D 1/0212; G05D 1/0011; A63G 25/00
See application file for complete search history.

(56) References Cited

U.S. PATENT DOCUMENTS

| | | | |
|---|---|---|---|
| 2014/0129074 A1* | 5/2014 | Boshears | G05D 1/0297 701/25 |
| 2015/0012157 A1* | 1/2015 | Nemeth | B61B 13/00 701/19 |
| 2015/0336012 A1* | 11/2015 | Maycock | G05D 1/0022 701/2 |
| 2017/0169366 A1* | 6/2017 | Klein | G06Q 10/025 |

* cited by examiner

*Primary Examiner* — Mary Cheung
(74) *Attorney, Agent, or Firm* — Maze IP Law, P.C.

(57) ABSTRACT

A trackless vehicle may be dispatched in a ride path comprising a predefined path and a set of optional predefined paths by receiving, such as by an on-board trackless vehicle controller, a rider identifier associated with a rider who is associated with the trackless vehicle, either a rider about to board the trackless vehicle or a rider who has boarded the trackless vehicle. Upon receipt, identification, and validation of the rider identifier, a predetermined set of optional predefined paths available to and associated with the validated rider identifier are identified and one or more of the predefined paths are selected, with the trackless vehicle being commanded to proceed onto the selected predefined path.

20 Claims, 2 Drawing Sheets

RIDER CONTROLLED TRACKLESS RIDE SYSTEM

RELATION TO OTHER APPLICATIONS

This application claims the benefit of U.S. Provisional Patent Application 62/315,425 titled "Rider Controlled Trackless Ride System" filed on Mar. 30, 2016.

FIELD OF THE INVENTION

The disclosed invention relates to amusement park rides.

BACKGROUND OF THE INVENTION

Complex amusement rides, including tracked and trackless dark ride systems, represent a significant capital investment for themed entertainment operators, and must be designed and marketed to ensure long term periods of guest attraction for the ride experience.

The introduction period of new rides and attractions often presents the highest level of attraction, as guests have not been able to repeatedly experience the attraction. As time goes by, the level of attraction decreases, and themed entertainment owners often invest in costly subsequent changes, in order to adapt and add newness to the ride experience. These changes include the movement of structural track and ride infrastructure, movement and change of scenic show elements, and changes to attraction media.

These costly changes and other drawbacks exist.

FIGURES

The figures supplied herein illustrate various embodiments of the invention.

DESCRIPTION OF EXEMPLARY EMBODIMENTS

As disclosed, embodiments of invention provide a multitude of individualized ride experiences, which may include rider input, that determines where trackless vehicles 20,320 advance within the ride space 200.

Figure 1:
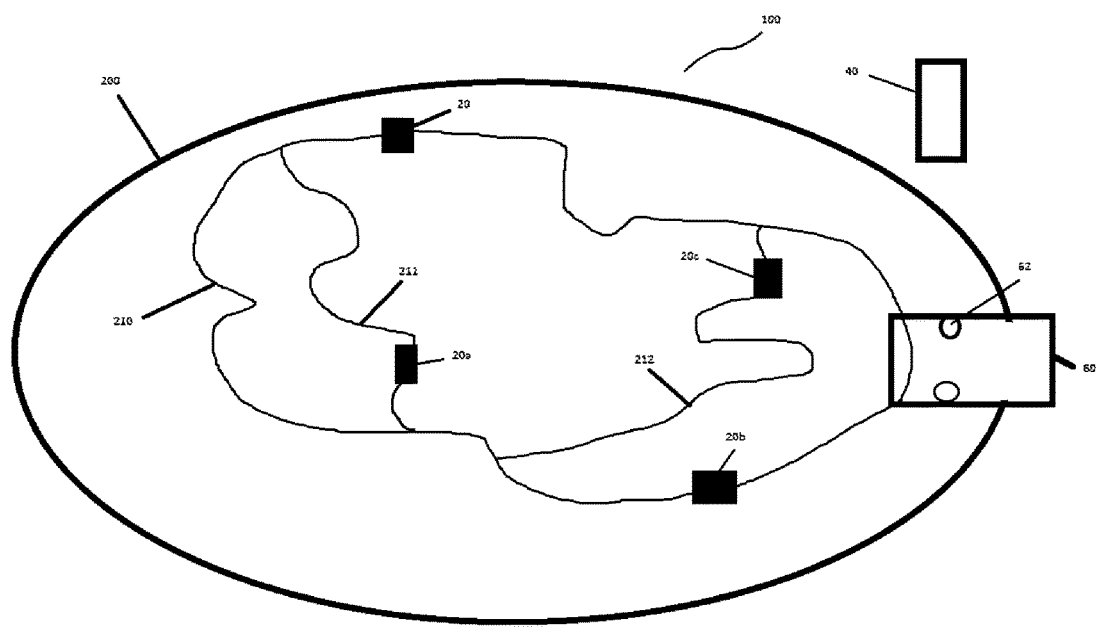
FIG. 1 is a diagrammatic overview of a first exemplary ride system.

In a first embodiment, referring now to FIG. 1, trackless ride system 100 comprises ride path area 200 comprising a plurality of predefined vehicle traversal paths, generally referred to as 210 and illustrated as general path 210 and optional paths 211 and 212, about and/or within ride path area 200; one or more controllable trackless ride vehicles 20, including 20a-20c, which are dispatchable and maneuverable along vehicle traversal paths 210; wireless ride communicator 30 (FIG. 2) operatively in communication with independent vehicle controller 23; and central control unit 40 operatively in communication with independent vehicle controller 30.

Figure 2:
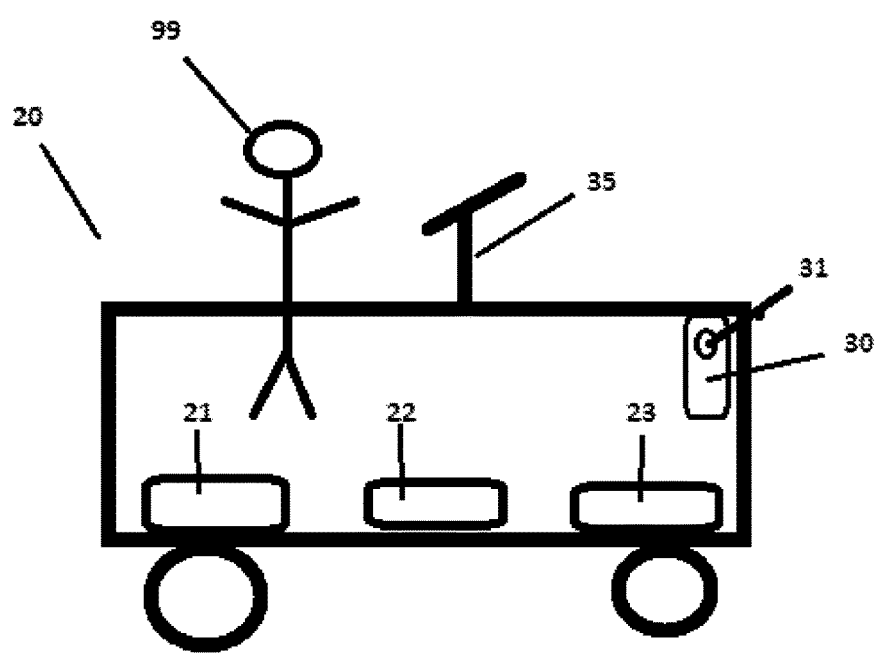
FIG. 2 is a block diagram of a first exemplary ride vehicle.

In embodiments, and referring additionally to FIG. 2, controllable trackless ride vehicle 20 comprises one or more track navigators 21, which can be redundant, as well as dynamically controllable ride vehicle motive system 22 and one or more independent vehicle controllers 23 operatively in communication with track navigator 21 and ride vehicle motive system 22.

Wireless ride communicator 30 (FIG. 2) typically comprises a set of wireless rider communicators 31 (FIG. 2) associatable with a corresponding set of trackless ride vehicle riders 99 (FIG. 2) and one or more facility mounted sensors 62, typically disposed proximate facility 60, adapted to capture discrete input from the set of wireless rider communicators 99. In embodiments, the discrete input may comprise a status of a predetermined set of non-ride vehicle related events associated with the set of trackless ride vehicle riders 99.

Facility mounted sensor 62 may comprise a non-contact facility mounted sensor, e.g. a visual or other optical sensor such as a camera, a motion recognizer, a facial feature recognizer, a voice recognizer, and/or a radio frequency identifier (RFID) receiver, or the like, or a combination thereof.

Wireless ride communicator 30 (FIG. 2) may further comprise vehicle mounted rider interface 35 (FIG. 2) operatively in communication with independent vehicle controller 22 (FIG. 2) and configured to allow a rider of the set of trackless ride vehicle riders 99 (FIG. 2) to control an predetermined aspect of traversal of wireless trackless ride vehicle 20 in which the rider is typically situated about or within ride path area 200. In certain embodiments facility mounted sensor 62 is operatively in communication with vehicle mounted rider interface 35.

Figure 3:
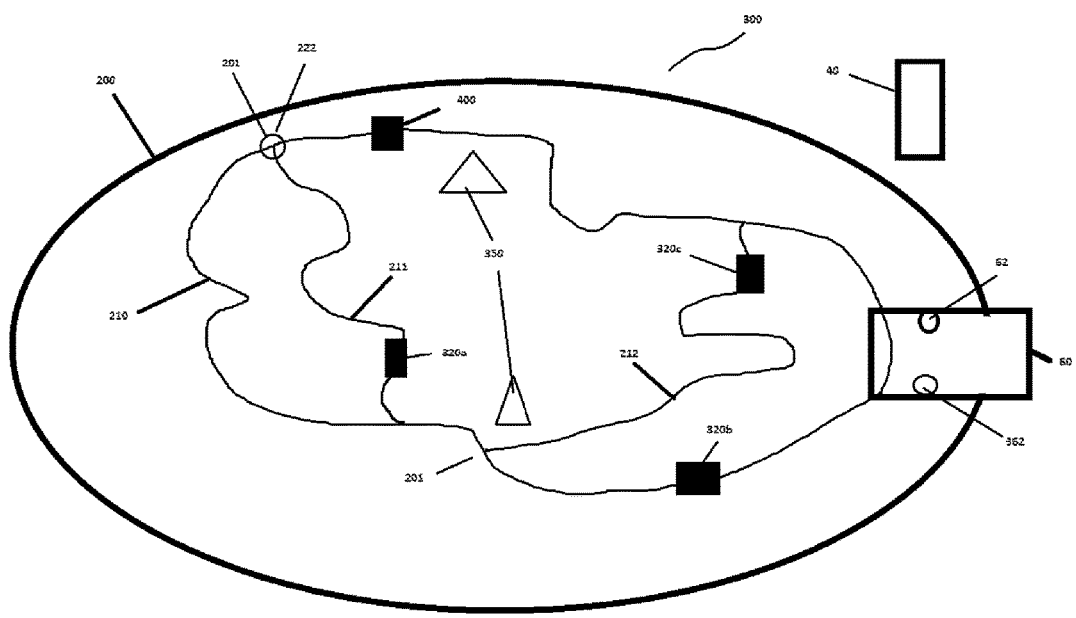
FIG. 3 is a diagrammatic overview of a second exemplary ride system.

In a second embodiment, referring now to FIG. 3, trackless ride system 300 comprises a plurality of dynamically selectable predefined paths 210 within predefined ride vehicle path area 200 and a plurality of wireless, self-dispatching trackless ride vehicles 320, e.g. 320a-320c, maneuverable along the plurality of dynamically selectable predefined paths 210 such as paths 211 and 212. Additional ride vehicles 400 may also be present.

At least one wireless, self-dispatching trackless ride vehicle 320 comprises dynamically controllable trackless ride vehicle motive system 322 (FIG. 4), one or more navigators 321 (FIG. 4) operatively in communication with dynamically controllable trackless ride vehicle motive system 322, independent vehicle controller 323 (FIG. 4) operatively in communication with navigator 321, one or more spatial positional determinators 324 (FIG. 4) operatively in communication with independent vehicle controller 323, and a predetermined array of multi-dimensional peripheral object detection sensors 325 (FIG. 4) operatively in communication with independent vehicle controller 323. Spatial positional determinators 324 typically comprise a GPS-based spatial positional determinator.

Figure 4:
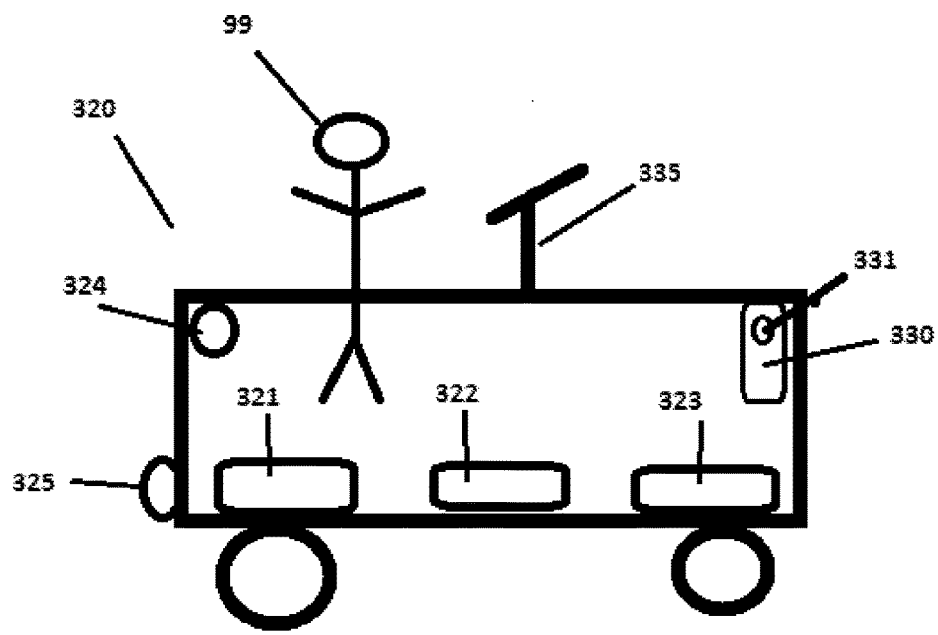
FIG. 4 is a block diagram of a second exemplary ride vehicle.

At least one wireless, self-dispatching trackless ride vehicle 320 (FIG. 4), e.g. at least one of 320a-320c (FIG. 4), is configured to advance along a dynamically selectable predefined path 211,212 of the plurality of dynamically selectable predefined paths 210 pursuant to a set of ride path selection decision points 201 which may be defined by a set of multi-dimensional peripheral objects 350 which are detectable by multi-dimensional peripheral object detection sensors 325 (FIG. 4).

In certain embodiments, vehicle mounted rider interface 335 (FIG. 4) is present and operatively in communication with independent vehicle controller 323 (FIG. 4) and configured to allow rider 99 (FIG. 4) to control a predetermined set of ride path characteristics. Typically as well, a set of geographic tags 222 may be present and define a set of decision points 201 which, based at least partially on input from the rider, are usable as input to independent vehicle controller 323 (FIG. 4) to aid in selection of a predefined route 211,212 for self-dispatching trackless ride vehicle 320 to traverse.

In addition, one or more facility mounted sensor/interfaces 362 may be present and operatively in communication with independent vehicle controller 323 (FIG. 4) and configured to allow a rider to control a predetermined set of ride path characteristics. A set of geographic tags 222 may be present which define a set of decision points which, based at least partially on input from rider 99 (FIG. 4), are usable as input to independent vehicle controller 323 (FIG. 4) to aid in selection of a predefined route 211,212 for self-dispatching trackless ride vehicle 320 to traverse.

In certain embodiments, one or more vehicle mounted rider interfaces 335 (FIG. 4) may be present and operatively in communication with independent vehicle controller 323 (FIG. 4) and accessible to rider 99 (FIG. 4) in self-dispatching trackless ride vehicle 320 and configured to allow rider 99 to control a first predetermined set of ride path characteristics. In these embodiments, one or more facility mounted sensor/interfaces 362 may also be present and operatively in communication with independent vehicle controller 323 and configured to allow rider 99 to control a second predetermined set of ride path characteristics based on a status of non-ride vehicle such as ride vehicle 400. A set of geographic tags 222 may be present and define a set of decision points which, based at least partially on input from rider 99, are usable as input to independent vehicle controller 323 to aid in selection of predefined route 211,212 for self-dispatching trackless ride vehicle 320 to traverse.

In the operation of exemplary embodiments, riders such as ride 99 ((FIGS. 2,4) may be conveyed in trackless ride vehicles 20,320 through varying combinations of physical scenes and experiences by dispatching individual trackless vehicles 20,320 onto one or more predefined paths 210 chosen in part by direct rider input at decision points 201 throughout the attraction. Decision points 201 and requests for rider input may be themed to match a storyline or progression of the ride experience.

In a first method, trackless vehicle 20,320 may be dispatched along a set of predetermined ride paths 211,212 of trackless ride system 100,300 by using independent vehicle controller 23,323 to receive a rider path selection request from rider 99 (FIG. 2,4) associated with trackless ride vehicle 20,320 to advance trackless ride vehicle 20,320 onto an optional predefined path 211,212 of a plurality of optional predefined paths via vehicle mounted rider interface 35,335.

Upon receipt of the rider selection request, the rider selection request is typically validated against a predetermined set of validation criteria. If validated, trackless ride vehicle 20,320 is then directed or otherwise commanded such as with a set of predefined instructional codes executable by independent vehicle controller 22,322 to proceed onto the requested optional predefined path 211,212. The rider selection request may be received while trackless ride vehicle 20,320 is in transit along a predefined path 211,212 of the plurality of optional predefined paths 210 or prior to approaching predefined path 211,212.

In certain embodiments, current status information related to a predetermined number of other trackless vehicles active 20,320 currently present along paths 210 may be sent to trackless vehicle on-board controller 22,322, such as through a wireless connection via wireless ride communicator 30,330, so that each independent trackless ride vehicle 20,320 can use the current status information to present possible available optional predefined paths of the plurality of optional predefined paths 211-212 at a defined decision point 201 along the various ride paths.

The rider selected request signal may be sent to central controller 40 while trackless ride vehicle 20,320 is currently traversing its current predefined path, or while trackless ride vehicle 20,320 is stopped at stationary point 202 within the ride, or the like, or a combination thereof.

A current status may be broadcast by each trackless vehicle 20,320 at one or more time intervals such as time intervals defined by the current elapsed time of trackless vehicle 20,320 on a unique predefined path of the plurality of optional predefined paths.

If no rider selected request is made and no resulting signal is sent to central controller 40, independent controller 23,323 may be used to make or otherwise respond to a rider selected request programmatically such as by way of ordinal or randomized selection.

In certain embodiments, at least one status of non-ride vehicle related system 400 may be broadcast and a subset of predefined paths 211,212 selected from the plurality of optional predefined paths 210 based on the received status of an alternative ride vehicle 400.

In a further embodiment, trackless vehicle 20,320 may be dispatched about a predefined path 211,212 from a set of optional predefined paths 210 by receiving a rider identifier associated with rider 99 (FIG. 2,4) who is associated with trackless vehicle 20,320 by an on-board trackless vehicle controller such as independent vehicle controller 22,322 where rider 99 associated with trackless vehicle 20,320 is a rider about to board or who has boarded trackless vehicle 20,320.

Upon receipt of the rider identifier, the rider identifier is validated. In embodiments, interactive, wearable, or otherwise portable devices may be present that can store a rider's identity, e.g. a game related identity for a personal game console, mobile device, or computer, or the like. Rider 99 (FIGS. 2,4) can enter trackless ride system 100,300 and specifically request performance of an initial scan of the rider's device before entering trackless ride vehicle 20,320 to obtain a rider identifier, or the trackless ride system can detect such a device and rider identifier automatically. In either event, the trackless ride system can then adjust the ride experience to be a continuation of the game experience by choosing a set of predefined paths associated with the rider's identifier and allowing the vehicle with that rider to proceed along the chosen set of predefined paths.

Once identified, such as by use of a rider's device, and validated, a predetermined set of optional predefined paths 211,212 is identified as being available to and associated with the validated rider identifier. If validated and identified, one predefined path 211 from the predetermined set of optional predefined paths 210 is selected and trackless vehicle 20,320 commanded to proceed onto the selected predefined path 211.

As used herein, one of ordinary skill in the ride vehicle arts will understand that to command ride vehicle 20,320 is typically provided with a set of instructional codes for use by independent vehicle controller 23,323 which can be interpreted and/or executed by independent vehicle controller 23,323 to cause dynamically controllable ride vehicle motive system 22,322 to proceed in a certain direction at a certain speed, typically in conjunction with an associated track navigator 21,321. The instructional codes may be stored in independent vehicle controller 23,323 and/or track navigator 21,321 and/or may be received dynamically such as from central control unit 40.

In this manner, trackless ride vehicles 20,320 may be dispatched as a plurality of trackless ride vehicles 20,320 conveying riders 99 through varying combinations of physical scenes and experiences as a grouping of trackless ride vehicles 20,320. Decision points 201 and requests for rider input may be themed to allow riders 99 the choice of maintaining or abandoning the vehicle grouping by dispatching individual trackless ride vehicles 20,320 onto predefined paths 211,212 that may converge or diverge from the vehicle grouping, within the context of storyline or progression of the ride experience.

As described herein, in embodiments vehicle mounted and/or facility mounted sensors/interface are operatively cooperative to allow riders control the path/profile/etc., e.g. there is a sensor/rider interface which may comprise vehicle based sensors/interfaces, facility based sensors/interfaces, or the like, or a combination thereof.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A trackless ride system, comprising:
   a. a ride path area comprising a plurality of predefined optional vehicle traversal paths about the ride path area;
   b. a controllable trackless ride vehicle dispatchable and maneuverable along the optional vehicle traversal paths, the controllable trackless ride vehicle comprising:
      i. a track navigator;
      ii. a dynamically controllable ride vehicle motive system; and
      iii. an independent vehicle controller operatively in communication with the track navigator and the ride vehicle motive system;
   c. a wireless ride communicator operatively in communication with the independent vehicle controller, the ride communicator comprising:
      i. a set of wireless rider communicators associatable with a set of trackless ride vehicle riders; and
      ii. a facility mounted sensor adapted to capture discrete input from the set of wireless rider communicators, the discrete input comprising a status of a predetermined set of non-ride vehicle related events associated with the set of trackless ride vehicle riders; and
   d. a central control unit operatively in communication with the independent vehicle controller.

2. The trackless ride system of claim 1, wherein the facility mounted sensor comprises a non-contact facility mounted sensor.

3. The trackless ride system of claim 2, wherein the sensor comprises a radio frequency identifier (RFID) receiver, a motion recognizer, a facial feature recognizer, or a voice recognizer.

4. The trackless ride system of claim 1, wherein the communicator further comprises a vehicle mounted rider interface operatively in communication with the independent vehicle controller and configured to allow a rider of the set of trackless ride vehicle riders to control an predetermined aspect of traversal of the wireless, trackless ride vehicle about the ride path area.

5. The trackless ride system of claim 4, further comprising a facility mounted sensor/interface operatively in communication with the vehicle mounted rider interface.

6. A trackless ride system, comprising:
   a. a plurality of dynamically selectable predefined paths within a predefined ride vehicle path area; and
   b. a plurality of wireless, self-dispatching trackless ride vehicles maneuverable along the plurality of dynamically selectable predefined paths, at least one wireless, self-dispatching trackless ride vehicle comprising:
      i. a dynamically controllable trackless ride vehicle motive system;
      ii. a navigator operatively in communication with the dynamically controllable trackless ride vehicle motive system;
      iii. an independent vehicle controller operatively in communication with the navigator;
      iv. a spatial positional determinator operatively in communication with the independent vehicle controller; and
      v. a predetermined array of multi-dimensional peripheral object detection sensors operatively in communication with the independent vehicle controller.

7. The trackless ride system of claim 6, wherein the spatial positional determinator comprises a GPS-based spatial positional determinator.

8. The trackless ride system of claim 6, wherein one of plurality of wireless, self-dispatching trackless ride vehicles is configured to advance along a dynamically selectable predefined path of the plurality of dynamically selectable predefined paths pursuant to a set of ride path selection decision points defined by a set of multi-dimensional peripheral objects which are detectable by the detection sensors.

9. The trackless ride system of claim 6, further comprising:
   a. a vehicle mounted rider interface configured to allow a rider to control a predetermined set of ride path characteristics, the vehicle mounted rider interface operatively in communication with the independent vehicle controller; and
   b. a set of geographic tags defining a set of decision points which, based at least partially on input from the rider, are usable as input to the independent vehicle controller to aid in selection of a predefined route for a self-dispatching trackless ride vehicle of the plurality of self-dispatching trackless ride vehicle to traverse.

10. The trackless ride system of claim 6, further comprising:
    a. a facility mounted sensor/interface configured to allow a rider to control a predetermined set of ride path characteristics, the facility mounted sensor/interface operatively in communication with the independent vehicle controller; and
    b. a set of geographic tags defining a set of decision points which, based at least partially on input from the rider, are usable as input to the independent vehicle controller to aid in selection of a predefined route for a self-dispatching trackless ride vehicle of the plurality of self-dispatching trackless ride vehicle to traverse.

11. The trackless ride system of claim 6, further comprising:
    a. a vehicle mounted rider interface configured to allow a rider to control a first predetermined set of ride path characteristics, the vehicle mounted rider interface operatively in communication with the independent vehicle controller;
    b. a facility mounted sensor/interface configured to allow the rider to control a second predetermined set of ride path characteristics based on a status of a non-ride vehicle system, the facility mounted sensor/interface operatively in communication with the independent vehicle controller; and c. a set of geographic tags defining a set of decision points which, based at least partially on input from the rider, are usable as input to the independent vehicle controller to aid in selection of a predefined route for a self-dispatching trackless ride vehicle of the plurality of self-dispatching trackless ride vehicle to traverse.

12. A method of dispatching a trackless vehicle along a set of predetermined ride paths of a trackless ride system comprising a ride path comprising a plurality of optional predefined paths; a controllable wireless, trackless ride vehicle dispatchable and maneuverable along the ride path, the wireless, trackless ride vehicle comprising a controllable, motive trackless ride vehicle track navigator and an independent vehicle controller operatively in communication with the track navigator; a communicator operatively in communication with the independent vehicle controller, the communicator comprising a vehicle mounted rider interface adapted to capture discrete input from a predetermined set of wireless, trackless ride vehicle riders associated with the trackless ride vehicle; and a central controller operatively in communication with the independent vehicle controller, the method comprising:

a. using the independent vehicle controller to receive a rider path selection request from a rider associated with the trackless ride vehicle to advance the trackless ride vehicle onto an optional predefined path of a plurality of optional predefined paths via the vehicle mounted rider interface;

b. upon receipt of the rider selection request, validating the rider selection request against a predetermined set of validation criteria; and c. upon validation, commanding the trackless ride vehicle to proceed onto the requested optional predefined path.

13. The method of dispatching a trackless vehicles receiving of claim 12, further comprising receiving the rider selection request while the trackless ride vehicle is in transit along a predefined path of the plurality of optional predefined paths.

14. The method of dispatching a trackless vehicles receiving of claim 12, further comprising sending current status information related to a predetermined number of other trackless vehicles active on the network to the trackless vehicle on-board controller, through a wireless connection, so that each independent trackless ride vehicle can use the current status information to present possible available optional predefined paths of the plurality of optional predefined paths at a defined decision point along the ride.

15. The method of dispatching a trackless vehicles receiving of claim 12, further comprising sending the rider selected request signal to the central controller while the trackless ride vehicle is currently traversing its current predefined path.

16. The method of dispatching a trackless vehicles receiving of claim 12, further comprising sending the rider selected request signal to the central controller while the trackless ride vehicle is stopped at a stationary point within the ride.

17. The method of dispatching a trackless vehicles receiving of claim 12, further comprising broadcasting a current status by each trackless vehicle at an interval defined by current elapsed time by that trackless vehicle on a unique predefined path of the plurality of optional predefined paths.

18. The method of dispatching a trackless vehicles receiving of claim 12, wherein, if no rider selected request is made and no resulting signal is sent to a central controller, using the independent controller to make the rider selected request programmatically by way of ordinal or randomized selection.

19. The method of dispatching a trackless vehicles receiving of claim 12, further comprising:

a. receiving at least one status of a non-ride vehicle related system; and b. selecting a subset of predefined paths from the plurality of optional predefined paths based on the received status of the non-ride vehicle related system.

20. A method of dispatching a trackless vehicle of a plurality of trackless vehicles about a predefined path from a set of optional predefined paths, the method comprising:

a. receiving a rider identifier associated with a rider who is associated with a trackless vehicle by an on-board trackless vehicle controller, the rider associated with the trackless vehicle being a rider about to board the trackless vehicle or a rider who has boarded the trackless vehicle;

b. upon receipt of the rider identifier, validating the rider identifier;

c. identifying a predetermined set of optional predefined paths available to and associated with the validated rider identifier;

d. upon validation and identification,
   i. selecting one predefined path from the predetermined set of optional predefined paths; and
   ii. commanding the trackless vehicle to proceed onto the selected predefined path.

* * * * *